(12) United States Patent
Basham

(10) Patent No.: US 12,017,478 B1
(45) Date of Patent: Jun. 25, 2024

(54) TIRE CADDY JACK

(71) Applicant: Brian Basham, Denver, CO (US)

(72) Inventor: Brian Basham, Denver, CO (US)

(*) Notice: Subject to any disclaimer, the term of this patent is extended or adjusted under 35 U.S.C. 154(b) by 412 days.

(21) Appl. No.: 17/344,905

(22) Filed: Jun. 10, 2021

Related U.S. Application Data

(60) Provisional application No. 63/008,640, filed on Apr. 10, 2020.

(51) Int. Cl.
| *B60B 29/00* | (2006.01) |
| *B60B 30/10* | (2006.01) |
| *B66F 3/12* | (2006.01) |
| *B66F 5/02* | (2006.01) |

(52) U.S. Cl.
CPC ............ *B60B 29/002* (2013.01); *B60B 30/10* (2013.01); *B66F 3/12* (2013.01); *B66F 5/025* (2013.01); *B60B 2340/50* (2013.01)

(58) Field of Classification Search
CPC ....... B60B 29/002; B60B 30/02; B60B 30/10; B60B 2340/50; B60B 2340/70; B66F 3/12; B66F 5/025
USPC .......................................... 414/426–430, 911
See application file for complete search history.

(56) References Cited

U.S. PATENT DOCUMENTS

| 2,380,415 | A | * | 7/1945 | Carruthers | ............ | B60B 29/002 |
| | | | | | | 414/429 |
| 2,725,997 | A | * | 12/1955 | Shvetz | .................. | B60B 29/002 |
| | | | | | | 414/427 |
| 3,937,343 | A | * | 2/1976 | Spulak | .................. | B60B 29/002 |
| | | | | | | 414/428 |
| 5,007,789 | A | * | 4/1991 | Painter | .................. | B60B 29/002 |
| | | | | | | 414/427 |
| 7,207,764 | B1 | * | 4/2007 | Snook | .................... | B66F 7/0625 |
| | | | | | | 414/427 |
| 10,336,591 | B1 | * | 7/2019 | McLean | .................... | B66F 3/12 |
| 11,634,307 | B2 | * | 4/2023 | Edwards, Sr. | ............ | B66F 5/04 |
| | | | | | | 414/427 |

FOREIGN PATENT DOCUMENTS

DE 202014104277 U1 * 10/2014 ........... B60B 29/001

* cited by examiner

*Primary Examiner* — James Keenan

(57) ABSTRACT

A system for a tire caddy and jack device to help a user easily perform tire changes on various-sized vehicles is disclosed. The Tire Caddy Jack is built using a base box supported by a plurality of casters that permits the entire Tire Caddy Jack to be moved easily around an automobile repair facility or garage. A scissor lift assembly is mounted in the center of the top surface of the base box. A scissor lift crank attaches to the scissor lift assembly that when turned will cause the scissor lift assembly to extend upwards, raising the tire and wheel above the ground. The tire and wheel rest upon rollers that are coupled to a pair of twin half roller arms mounted on top of the scissor lift assembly, permitting the tire and wheel to smoothly be raised and lowered to mount and unmount the tire and wheel onto a vehicle. The Tire Caddy Jack supports the tire and wheel while the mechanic removes or replaces the lug nuts or lug bolts that hold the tire and wheel on the vehicle.

9 Claims, 5 Drawing Sheets

TIRE CADDY JACK

TECHNICAL FIELD

This application relates in general to a system for providing an automobile repair garage tool, and more specifically, to a system for providing a tire caddy and jack device to assist with tire changes on vehicles.

BACKGROUND

Changing tires on vehicles of all sizes may present challenges to many amateur and professional mechanics who need to maneuver tires around a vehicle and then lift the tire into place to attach and tighten lug bolts or nuts. Tire sizes and weights vary considerably and can be unwieldy and heavy for larger vehicles. Many people may struggle to comfortably lift tires and wheels, and hold them into position until one or more lug nuts or bolts are in place to support the weight of the tire and wheel after the vehicle has been raised with a jack. Struggling with large tire changes is clumsy at best and may cause injury in the worst cases.

Therefore, a need exists for a system for providing a tire caddy and jack device that helps mechanics safely and efficiently change tires on vehicles.

SUMMARY

In accordance with the present invention, the above and other problems are solved by providing a system for a tire caddy and jack device to help a user easily perform tire changes on various-sized vehicles according to the principles and example embodiments disclosed herein.

In one embodiment, the present invention is a system for a tire caddy and jack device to help a user easily perform tire changes on various-sized vehicles. The Tire Caddy Jack is built using a base box supported by a plurality of casters that permit the entire Tire Caddy Jack to be easily moved around an automobile repair facility or garage. A scissor lift assembly is mounted in the center of the top surface of the base box. A scissor lift crank attaches to the scissor lift assembly that, when turned, will cause the scissor lift assembly to extend upwards, raising the tire and wheel in use above the ground. The tire and wheel rest upon rollers that are coupled to a pair of roller arms mounted on top of the scissor lift assembly, allowing the user to raise and lower a tire near the vehicle and smoothly mount or unmount the tire and wheel onto a vehicle. The Tire Caddy Jack supports the tire and wheel in place while the mechanic removes or replaces the lug nuts or lug bolts that hold the tire and wheel on the vehicle. A mechanic is able to readily maneuver the entire Tire Caddy Jack when a tire is resting on the roller arms to move it to and from the vehicle in addition to raising and lowering the wheel and tire from a vehicle hub.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only, and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
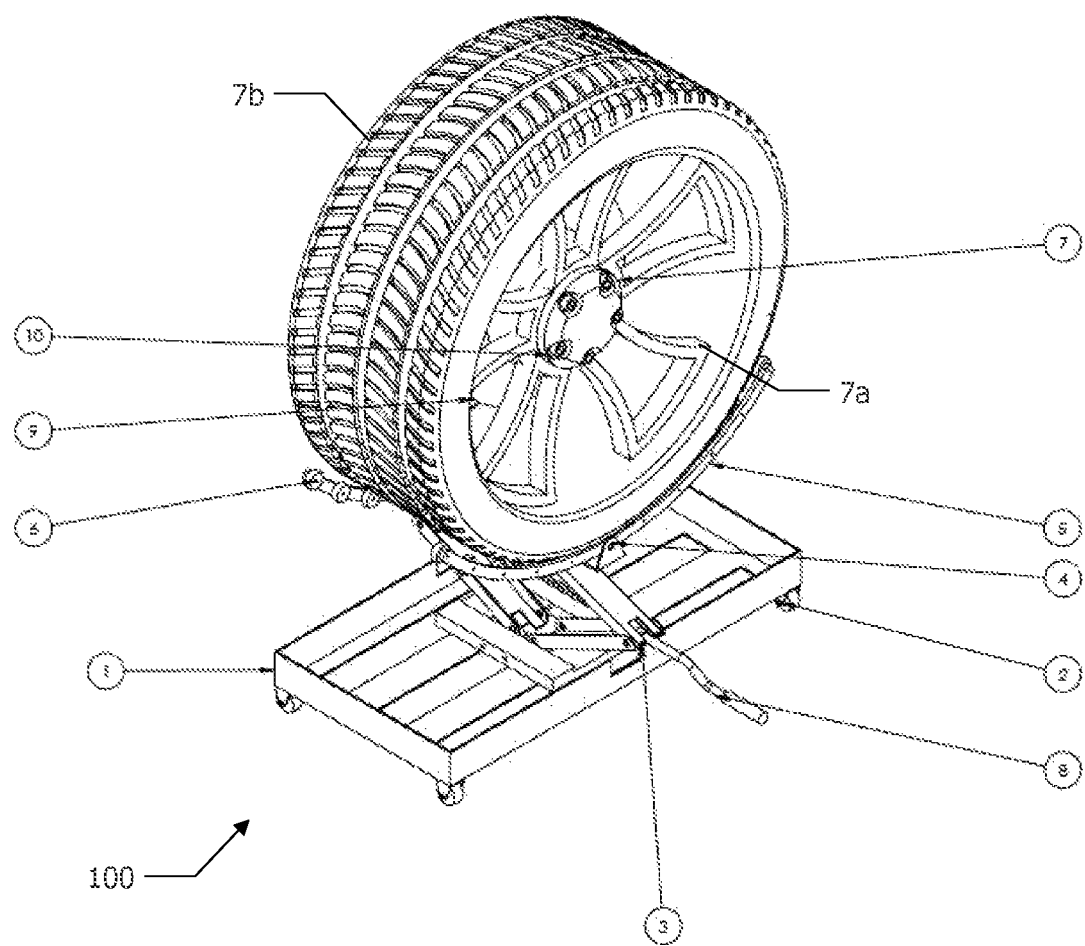
FIG. 1 illustrates an example embodiment for a system for a tire caddy and jack device to help a user easily perform tire changes on various-sized vehicles according to the present invention.

This application relates in general a system for providing an automobile repair garage tool, and more specifically, to a system for a tire caddy and jack device to help a user easily perform tire changes on various-sized vehicles according to the present invention.

An embodiment of the present invention will be described in detail in the drawings, wherein like reference numerals represent like parts and assemblies throughout the several views. Reference to this embodiment does not limit the scope of the invention, which is limited only by the scope of the claims attached hereto. Additionally, any example set forth in this specification is not intended to be limiting and merely sets forth one of the many possible embodiments for the claimed invention.

As used herein, the term "about" means that dimensions, sizes, formulations, parameters, shapes, and other quantities and characteristics are not and need not be exact, but may be approximated and/or larger or smaller, as desired, reflecting tolerances, conversion factors, rounding off, measurement error and the like, and other factors known to those of skill. Further, unless otherwise stated, the term "about" shall expressly include "exactly."

The terms "mechanic" and "user" refer to an entity, e.g. a human, using the tire caddy and jack device associated with the invention. The term user herein refers to one or more users.

The term "invention" or "present invention" refers to the invention being applied for via the nonprovisional patent application with the title "Tire Caddy Jack." Invention may be used interchangeably with "caddy," "tire caddy," "tire and jack device," and "Tire Caddy Jack."

In general, the present disclosure relates to a system for providing an automobile repair garage tool. To better understand the present invention, FIG. 1 illustrates an example embodiment for a system for a tire caddy and jack device to help a user easily perform tire changes on various-sized vehicles according to the present invention. The Tire Caddy Jack 100 is shown holding a tire and wheel combination as it would be used to lift the wheel to a height in which the wheel lugs may engage the holes in the rim thereby permitting one or more lug nuts to be manually tightened. The caddy device 100 comprises a base box 1 supported by a plurality of casters 2 that permits the Tire Caddy Jack 100 to be easily moved around an automobile repair facility or garage. A jack device, which in this embodiment corresponds to a scissor lift assembly 3, is mounted in the center of the top surface of the base box 1. A scissor lift crank 8 attaches to the scissor lift assembly 3 and when turned causes the scissor lift assembly 3 to extend upwards to raise the tire and wheel 7 above the ground. Use of the scissor lift crank 8 allows a mechanic to position the wheel 7a to a precise height that permits wheel holes 7c to align with the tire lugs 10 on the vehicle. For vehicles that use lug bolts 10 inserted into threaded holes 9a in the vehicle wheel 7a, the scissor lift assembly 3 lifts the wheel 7a to a height where the wheel holes in the wheel align with the threaded holes 9a (see FIG. 2) permitting lug bolts 10 inserted through the wheel holes 7b to engage the threaded holes 9a in a vehicle wheel hub 9.

The tire and wheel combination 7 is supported on top of the scissor lift assembly 3 by a pair of roller arms 5 coupled to a roller arm platform 4 that is connected to the top of the scissor lift assembly 3. Each of the roller arms 5 is positioned to be aligned with an edge of the tire 7b such that the bottom of the tire rests upon and is supported by a set of rollers 6 that are located on the inner surface of each roller arm 5. Each of the rollers within the set 6 is sized to support the tire 7b slightly above the pair of roller arms 5. Each of the rollers 6 also extend above the roller arms 5 and rotates freely so the tire 7b may easily spin its orientation within the pair of roller arms 5 permitting the mechanic to align the wheel holes 7c with lugs or the threaded holes 9a in the vehicle wheel hub 9.

The pair of roller arms 5 are arched upward at each end to support the tire 7b circumference for most, if not all, of the length of the roller arms. Each of the pair of roller arms 5 consists of two pairs of roller arms with the set of rollers 6 in between in which the pair of roller arms 5 are made from two twin half pairs of arms that are coupled together with a torsion spring at a pivot point 4a where the roller arms 5 connect to the roller arm platform 4. The two twin half pairs of roller arms are coupled together at an end of each at the location of a pivot point 4a. Each of the twin half arm pairs pivot up and down about the pivot point 4a to assist aligning the set of rollers to the outside circumference of the tire 7b.

Figure 2:
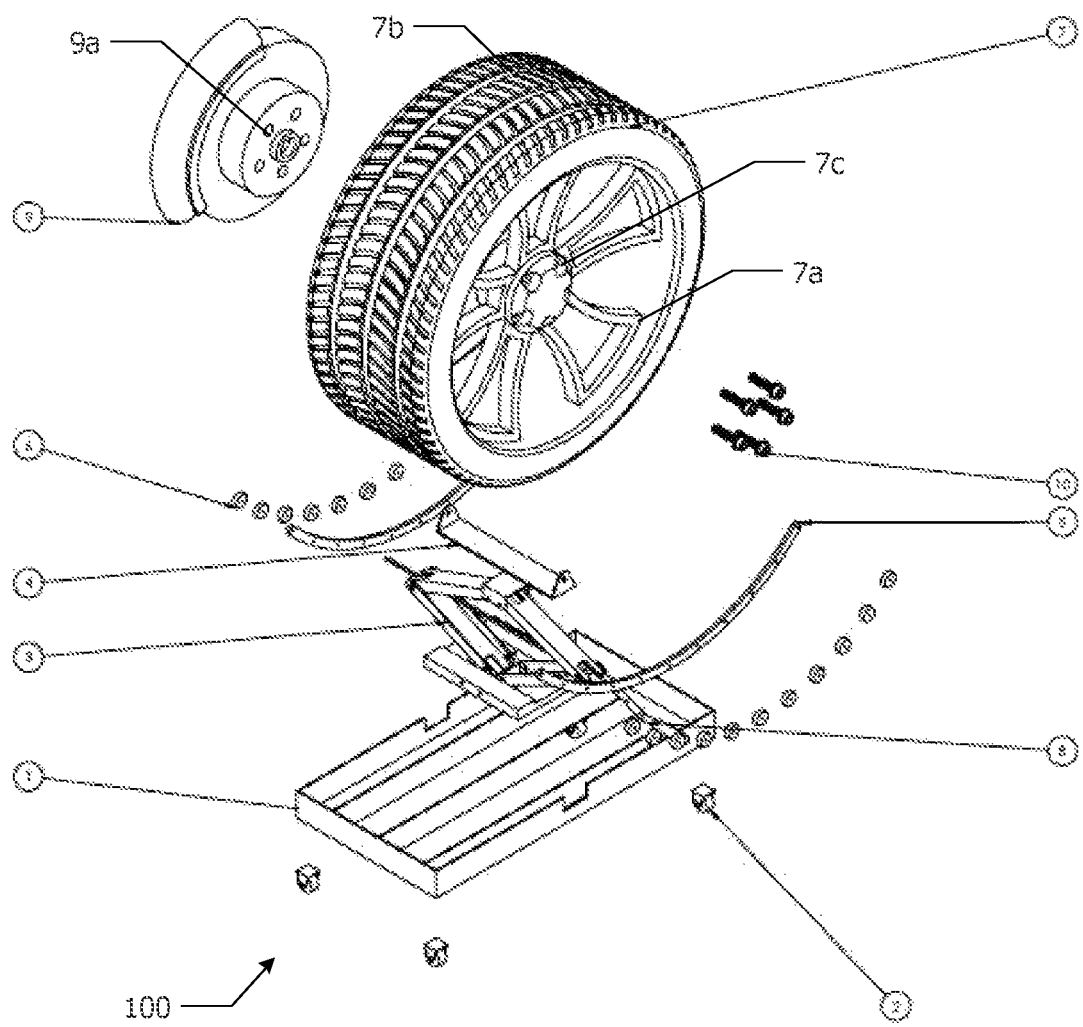
FIG. 2 illustrates an exploded view of the example embodiment of a system for a tire caddy and jack device to help a user easily perform tire changes on various-sized vehicles according to the present invention.

FIG. 2 illustrates an exploded view of the example embodiment of a system for a tire caddy and jack device to help a user easily perform tire changes on various-sized vehicles according to the present invention. In this view, the casters 2 are shown preferably to be located near the corners of the base box 1 and are attached to the lower surface of the base box. Additionally, the arch of the pair of twin half roller arm pairs 5 and the corresponding location of the roller arm 5 relative to the roller arm platform 4, the pivot point 4a, and the torsion springs are illustrated. The vehicle wheel hub 9 is shown at a height above the tire and wheel 7 such that the scissor lift assembly 3 may be extended to align the tire and wheel 7b with the vehicle hub so that the mechanic can mount them to the vehicle. FIG. 2 shows the use of lug bolts 10 that mate with the threaded holes 9a in the vehicle wheel hub 9.

While the embodiment shown in FIGS. 1-2 illustrates use of a scissor lift assembly 3, one of ordinary skill will recognize that other jack types or lifting mechanisms may be used in place of the scissor lift assembly 3 so long as the alternate jack devices can lift the tire and wheel 7 to the needed height while supporting their weight, and as long as the alternate jack devices permit the roller arm platform 4 to be mounted in a manner that permits the use of the pair of twin half roller arms 5 as disclosed herein. In some embodiments, different sizes of tire caddy jacks 100 may be used to accommodate a wide variety of tire sizes. Standard vehicle tires may use a standard size tire caddy jack and a larger tire caddy jack 100 may be needed to support larger truck and off road tires. For the larger embodiment, all of the components, from the jack assembly 3 to the roller arms 5 may need to be heavier and stronger to safely support the larger off-road tires.

Figure 3:
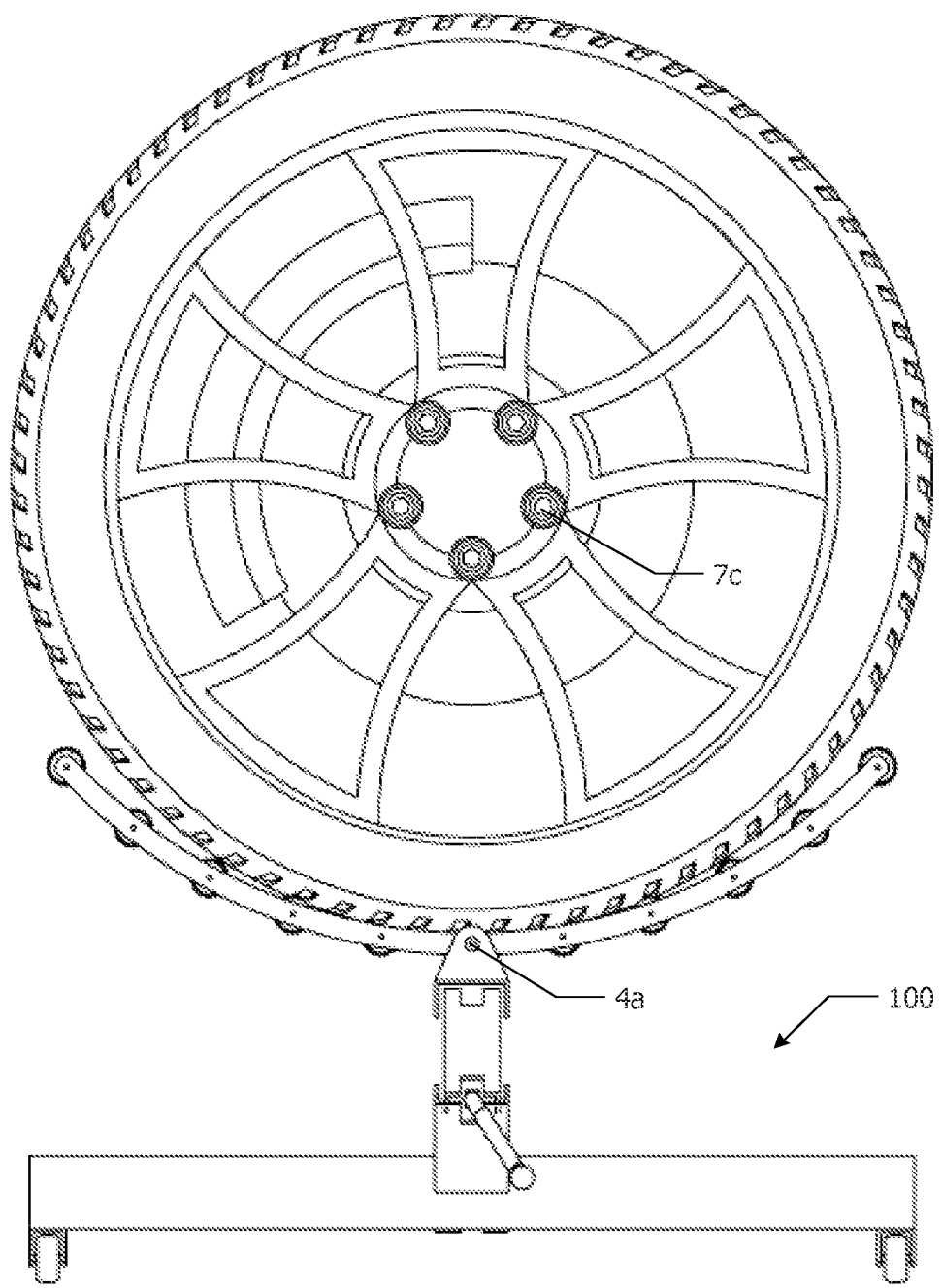
FIG. 3 illustrates a front view for the example embodiment of a system for a tire caddy and jack device to help a user easily perform tire changes on various-sized vehicles according to the present invention.

FIG. 3 illustrates a front view for the example embodiment of a system for a tire caddy and jack device to help a user easily perform tire changes on various-sized vehicles according to the present invention. In this view, the pair of twin half roller arms 5 are shown mounted to the roller arm platform using a connection point 4a located at the lower center of the roller arm arch. The roller arm 5 arch is also shown to closely conform to the outer circumference of the tire 7b using the torsion springs to pivot the arms into a desired position. Once again, the casters 2 are shown mounted to the bottom surface of the base box 1 at the corners of the box. In possible alternate embodiments, one or more of the casters 2 may include a brake device integral to the casters that help the mechanic position the tire and wheel 7 in a desired location while the tire and rim are mounted onto the vehicle.

Figure 4:
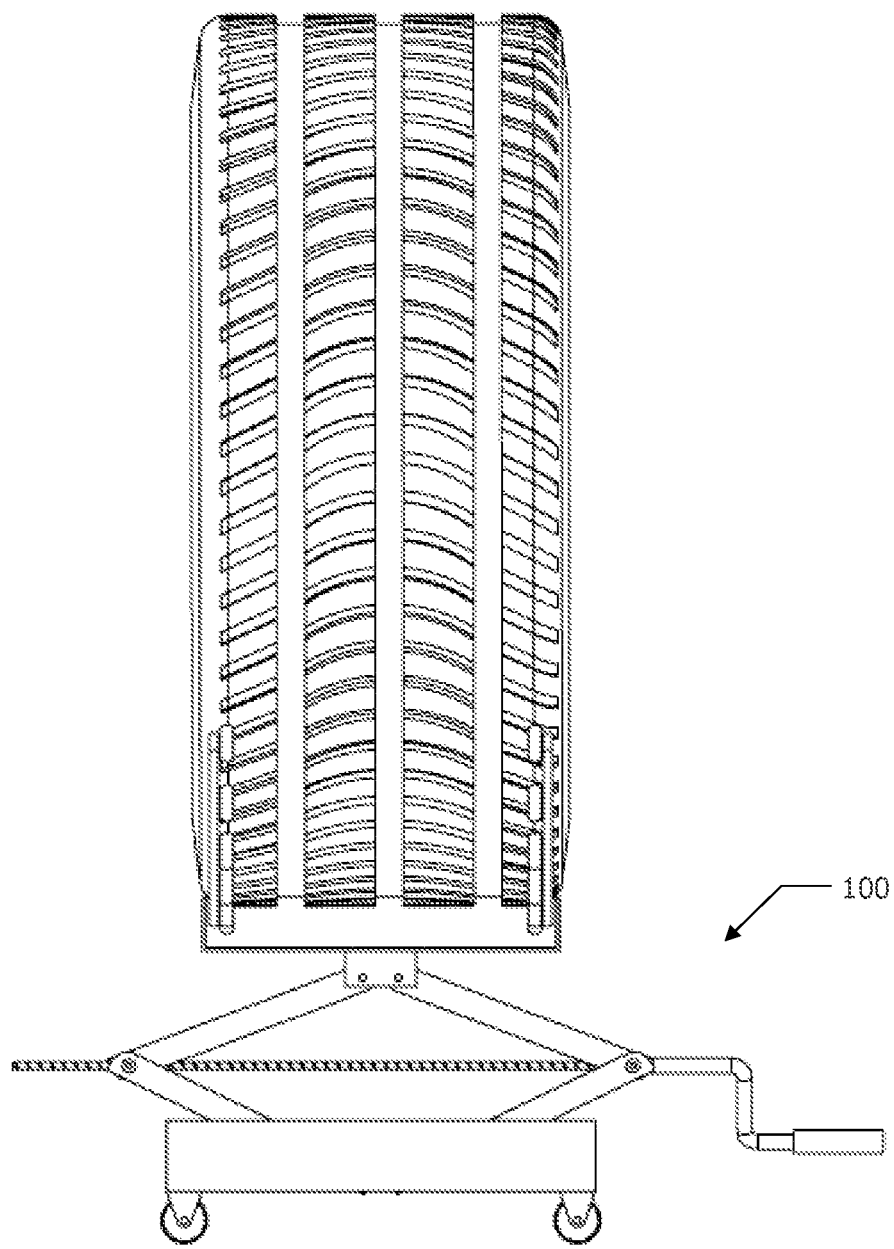
FIG. 4 illustrates a side view for the example embodiment of a system for a tire caddy and jack device to help a user easily perform tire changes on various-sized vehicles according to the present invention.

FIG. 4 illustrates a side view for the example embodiment of a system for a tire caddy and jack device to help a user easily perform tire changes on various-sized vehicles according to the present invention. In this view, the width of the base box 1 is shown to be at least as wide as the tire 7b it is supporting. The roller arm platform 4 is also shown to be approximately as wide as the tire 7b so that the roller arms 5 rest near the outer edges of the tire 7b, providing a stable platform for the tire and wheel 7 until they are mounted. Additionally, the scissor crank 8 and the scissor lift assembly may be replaced, if desired, by a power assisted device that uses electric or hydraulic power to lift the tire and wheel 7. The power assisted jack device may be useful for the largest and heaviest tires and wheels 7.

Figure 5:
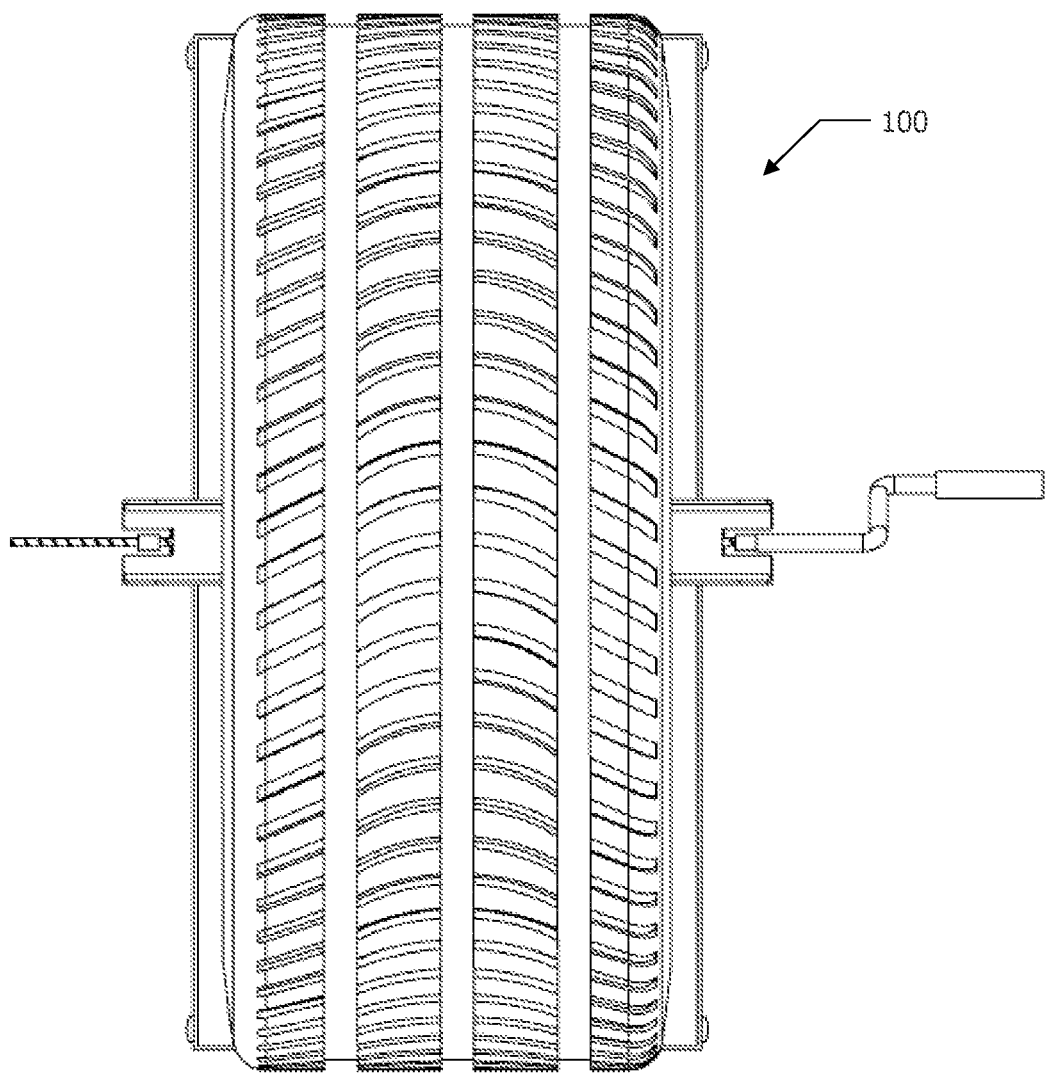
FIG. 5 illustrates a top view for the example embodiment of a system for a tire caddy and jack device to help a user easily perform tire changes on various-sized vehicles according to the present invention.

FIG. 5 illustrates a top view for the example embodiment of a system for a tire caddy and jack device to help a user easily perform tire changes on various-sized vehicles according to the present invention. Once again, the width of the base box 1 is shown to be at least as wide as the tire 7b it is supporting. Also, the scissor crank 8 typically extends far enough beyond the base box 1 to permit the mechanic to easily rotate the crank when lifting a tire and wheel 7, and when lowering the scissor lift once the tire and wheel are mounted on the vehicle.

The Tire Caddy Jack 100 also may be used to remove a tire and wheel 7 from the vehicle. In this use of the Tire Caddy Jack 100, the tire and wheel 7 are lifted along with the vehicle enough so that the Tire Caddy Jack may be placed underneath the tire 7b. The scissor lift assembly may be raised to align the roller arm rollers 6 with the outer tread of the tire. The lug nuts or lug bolts 10 may be removed and the weight of the tire and wheel 7 will be supported by the Tire Caddy Jack 100. Once the lug nuts or bolts 10 are removed, the mechanic may easily move the tire caddy jack 100 away from the vehicle, taking the tire and wheel 7 along with it. The scissor lift assembly 3 may be lowered either before or after the tire and wheel are away from the vehicle. The mechanic then easily replaces the tire and wheel with a new tire and wheel to be mounted onto the vehicle.

Even though a particular combination of features is recited in the present application, this combination is not intended to limit the disclosure of the invention. In fact, many of these features may be combined in ways not specifically recited in this application. In other words, any of the features mentioned in this application may be included in this new invention in any combination or combinations to allow the functionality required for the desired operations.

No element, act or instruction used in the present application should be construed as critical or essential to the invention unless explicitly described as such. Further, the phrase "based on" is intended to mean "based, at least in part, on" unless explicitly stated otherwise.

The invention claimed is:

1. A tire caddy and jack device, comprising:
    a base box supported by a plurality of casters;
    a lift assembly mounted on a top surface of the base box;
    a pair of arms convex to the base box, coupled to a platform, and connected to a top of the lift assembly, the pair of arms configured to support a tire and wheel combination, wherein the pair of arms are coupled together at a single pivot point of the lift assembly and comprise a plurality of roller pairs, wherein each of the roller pairs is positioned equidistant from each other along an outer circumference of the tire and wheel combination;
    a lift crank attached to the lift assembly, the lift crank configured to be turned such that the lift assembly extends upward to raise the tire and wheel combination.

2. The device according to claim 1, wherein the lift assembly is a scissor lift assembly and the lift crank is a scissor lift crank.

3. The device according to claim 1, wherein each of the arms comprises a plurality of rollers.

4. The device according to claim 3, wherein each of the arms is positionable to be aligned with an edge of the tire such that a bottom of the tire rests upon and is supported by the plurality of rollers that is located on an inner surface of each arm.

5. The device according to claim 3, wherein the plurality of rollers is sized to support the tire slightly above the arms.

6. The device according to claim 1, wherein the arms are arched upward at each end to support a circumference of the tire along a length of the arms.

7. The device according to claim 1, wherein the pivot point is located at a lower center of each of the arms, coupling the arms together.

8. The device according to claim 1, wherein the casters are attached to a lower surface of the base box at one or more corners of the base box.

9. The device according to claim 1, wherein one or more of the casters includes a brake device.

* * * * *